INVENTOR.
Jerome H. Lemelson

Jan. 28, 1964  J. H. LEMELSON  3,119,501
AUTOMATIC WAREHOUSING SYSTEM
Original Filed July 28, 1954  3 Sheets-Sheet 2

INVENTOR.
Jerome H. Lemelson
BY

Jan. 28, 1964 J. H. LEMELSON 3,119,501
AUTOMATIC WAREHOUSING SYSTEM
Original Filed July 28, 1954 3 Sheets-Sheet 3
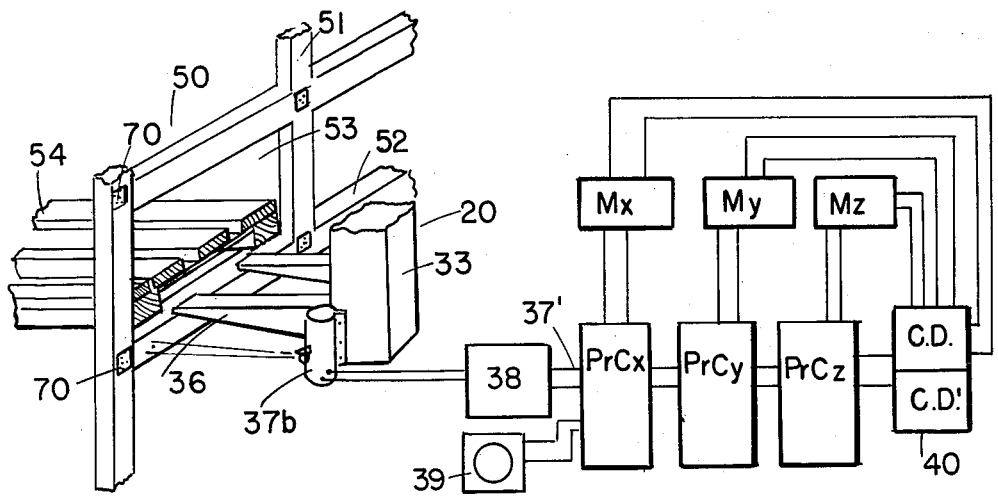
Fig. 4
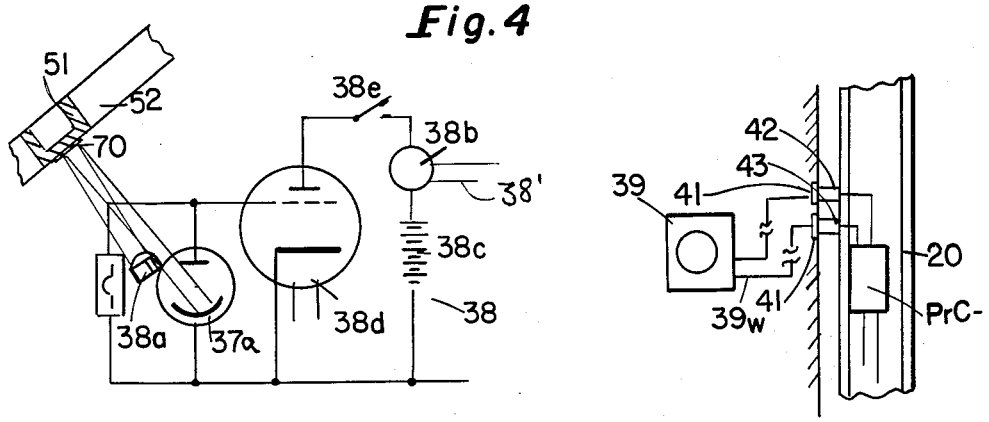
Fig. 5
Fig. 6
INVENTOR.
Jerome H. Lemelson
BY United States Patent Office 3,119,501
Patented Jan. 28, 1964

3,119,501
AUTOMATIC WAREHOUSING SYSTEM
Jerome H. Lemelson, 8B Garfield Apts., Metuchen, N.J.
Continuation of application Ser. No. 449,874, July 28,
1954. This application Oct. 10, 1961, Ser. No. 145,013
6 Claims. (Cl. 214—16.4)

This invention relates to an automatic conveying system particularly applicable to the automatic conveyance of work-in-process, materials and finished goods to and from a predetermined storage area and is a continuation of my copending application Ser. No. 449,874 which was filed on July 28, 1954 and is now abandoned.

Various types of conveyors and conveying systems are known in the art and are applicable for the storage of work-in-process and finished goods. Heretofore conveying equipment for moving palletized or boxed goods into and out of storage have required manual direction or manual remote control. Overhead or floor mounted stacker cranes have been employed for the movement of palletized articles but such equipment requires the manual attendance of an operator. An automatic warehousing system employing closed loop belt conveyors per se is limited to the storage of palletized or boxed material on a particular section of the conveyor and at substantially a single storage level. If storage at multiple levels is desired relatively complex elevating mechanisms and transfer devices are required.

It is accordingly a primary object of this invention to provide a new and improved automatic conveying apparatus which may be applicable to an automatic warehousing system or the like and which may be operated without human attendance.

Another object is to provide an improved automatic conveying apparatus including control apparatus for an article carrier which control apparatus may be programmed to effect the storage and conveying from storage selected material or work-in-process without manual attendance and control.

Another object of this invention is to provide an improved automatic conveyor and a storage system therefore which may be operated from a location remote from said storage system without human attendance or manual operation in an automatic cycle programmed at least in part by a pre-selection electrical switching means.

Another object is to provide a new and improved automatic conveying system employing one or more track guided carriers having prepositionable sub-carriers of the lift-fork type which require minimum aisle space and therefore permit maximum storage volume in a given warehousing area.

Still another object is to provide a new and improved automatic warehousing system for the selective movement of palletized materials or articles of manufacture which does not require the general facilities, such as electricity for lighting or heating, due to the elimination of attending personnel, and therefore may effect a substantial economic saving of time and expense to the operator of said apparatus.

Yet another object is to provide an improved automatic conveying apparatus including a self-propelled carrier adapted to travel in a fixed path and employing an improved non-contacting scanning system for indicating the position of said carrier.

Another object is to provide an improved automatic conveying apparatus including a carrier with a photoelectric scanning transducer or the like for sensing and indicating the position of said carrier, and which may be used for both the horizontal and vertical prepositioning and control means thereof.

Another object is to provide an improved automatic production system having a carrier with its control means or control system mounted on the carrier so that it is not necessary to provide externally of the carrier other continuously remote controlled means for the carrier.

With the above and such other objects in view, as may hereinafter more fully appear, the invention consists of the novel construction, combination and arrangements of parts as will be hereinafter more fully described, and illustrated in the accompanying drawings, wherein are shown embodiments of this invention, but it is to be understood that changes, variations and modifications may be resorted to which fall within the scope of the invention as claimed.

In the drawings:

FIG. 4 is a schematic diagram of a further portion of the control system for the apparatus shown in FIG. 1;

FIG. 5 is a circuit diagram of a photoelectric control circuit useful in the control system of the preferred embodiment of the apparatus of the invention shown in FIG. 1; and FIG. 6 shows means for presetting a counter of the control system.

Figure 1:
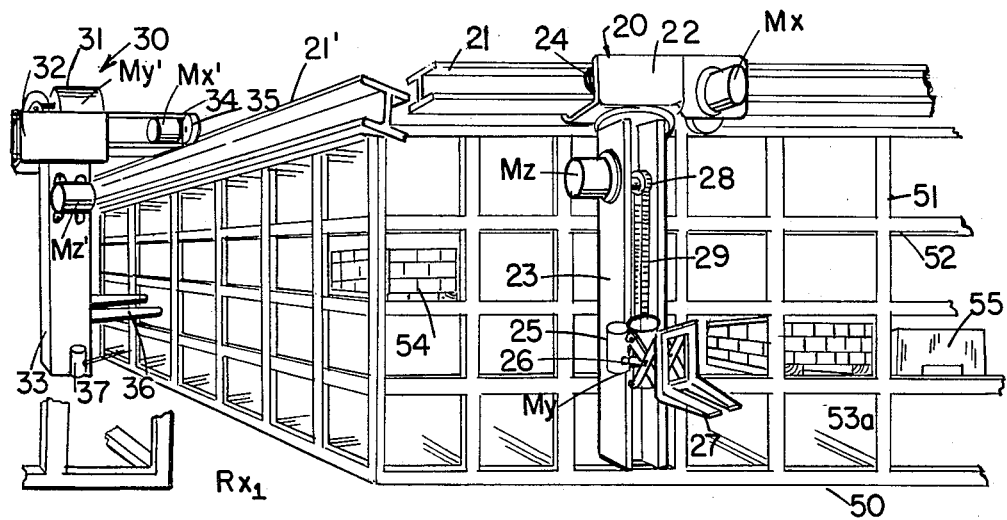
FIG. 1 is a perspective view of a preferred embodiment of the apparatus of the invention.

Referring now to the drawings, there is shown in the automatic production system of FIG. 1, a portion of an automatic warehousing system which employs one or more track travelling carriers 20, 30 which may be selectively positioned and remotely controlled as described hereinbelow, for the storage or retrieval of products or work-in-process relative to respective storage volumes in a storage racking system 50. The carrier 20 has an overhead track 21 from which is mounted vertically subtending assembly 23, and may have any suitable configuration, two specific designs of which are illustrated in FIG. 1. On carrier 20, a first carriage 22 is adapted for movement along the track 21 supported above the storage racking system 50 by conventional means. Subtending assembly 23 serves as a support and guide for a second carriage 25 which is movable up and down on assembly 23 by means of a drive and a motor Mz. The drive consists in part of a chain 29 driven by a sprocket 28 secured to the shaft of the motor Mz arranged in a conventional manner on the assembly to lift and lower the second carriage 25 in accordance with the direction of controlled rotation of said motor. A second motor Mx mounted on the first carriage 22 is operative to drive one or more wheels 24, 35 supported by said first carriage for propelling the assembly along the track.

A third motor My is mounted to the second carriage 25 and is operative to advance and retract a product or work-in-process holding means as shown in FIG. 1. The holding means is a fork assembly 27 which moves towards and away from the storage racking system 50 by means of a mechanical linkage 26. Guidance of the second carriage 25 during its travel up and down assembly 23 is effected by any conventional means.

The second design of the carrier 30 is also illustrated in FIG. 1; it consists of a first carriage 32 adapted for travelling along an overhead or cross aisle track 34 in a direction towards and away from the bays of the storage racking system 50, by control of the drive motor My mounted on the first carriage 32. The track 34 which extends across one or more aisles, such as the aisle designated as Rx, is supported at both ends by respective tracks, one of which is shown as track 21' and is an I-beam supported above the floor by the racking system 50. Movement of the cross-aisle track 34 and the carrier 30 parallel to the face of the racking is effected by means of a motor M$x'$ secured to the track 34 which drives wheels 35 rotationally supported at each end of the track 34, and which are guided in their travel along the respective tracks.

Subtending vertically from the first carriage 32 is a column 33 which supports and effects guided movement of a product handling fixture or fork assembly 36. A motor M$z'$ mounted on column 33, is effective in driving fork assembly 36 up and down relative to column 33 depending on the direction in which motor M$z$ is operated.

The racking system 50, part of which is illustrated in FIG. 1, consists in detail of a plurality of vertical beams 51 jointed to horizontal beams 52 in a lattice-like array to define respective cubicles or storage volumes 53$a$ into which pallets 54 containing products, or into which bins 55 containing materials or products, may be stored by the carrier 20, 30 servicing the racking system. Motor M$y'$ drives the first carriage 32 across track 34 and is utilized to move the fork assembly 36 in and out of the selected storage volume of the racking system whereas in the other carrier design, the motor M$y$ moves just the fork assembly 27 while the carrier 20 remains stationary.

Control of the track travelling carriers 20, 30 of FIG. 1 to a selected bay or aisle, and of the product holding means or fork assembly 27 to the proper level for selective storage or removal of a product from storage is effected by means of signals generated as the carrier and/or holding means moves, the total of which signals are indicative of the position of said carriers or fork assembly. Such signals may be generated by scanning the racking system 50, floor, overhead track or conveyor vertical column 30 or combinations of these. In FIG. 1, a sensing means such as a photo-electric scanner 37 is shown mounted on the column 33 for movement therewith. The scanner 37 may detect vertical beams 51 by means of sensing markers 56 which effect energization of a photoelectric relay 38 (FIG. 5) of said scanner 37 and provide a feedback signal as hereafter described in connection with FIG. 3. The relay may also be mounted on or between the fork assembly 36 for movement vertically therewith for vertical positional control of said fork assembly.

Figure 2:
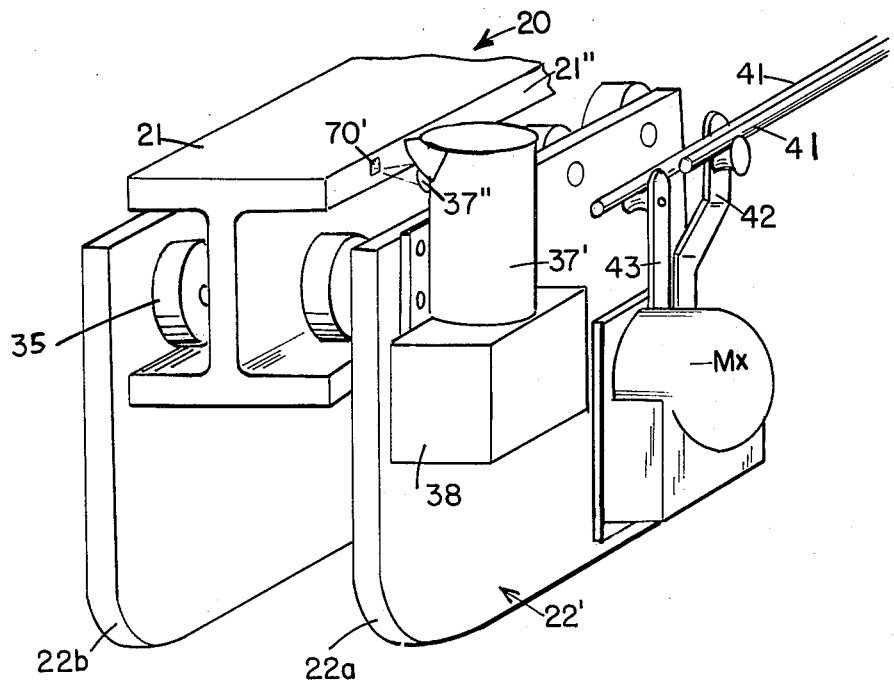
FIG. 2 is a perspective view of a part of a conveyor unit shown in FIG. 1.

The details of the components of the overhead carrier 20 are illustrated in FIG. 2. The carriage walls 22$a$ and 22$b$ bearingly support a plurality of wheels 35 which ride on the lower flange of track 21.

Certain of said wheels are operatively coupled to motor M$x$ for driving said carriage along the track 21. In FIG. 2, the photoelectric scanner 37' is positioned against the side wall of the carriage 32 with its aperture 37" facing the track for scanning the track edge 21" thereof which contains sensing or position indicating reflective marker 70'. The signals derived each time a marker is scanned by 37' may be used to uncount a predetermining counter or the like to effect positional control of the first carriage. Also shown in FIG. 2 are a pair of current conductors or rails 40, 41 which are insulatedly supported away from the first carriage 22' and off the track 21' and extend along parallel thereto. Brush or roller contactors mounted on the first carrier make engaging contact with said rails for conducting power to the various motors as well as control signals and feedback signals between said first carrier and remote by positioned computing or control apparatus.

The photoelectric scanning means of FIGS. 1 and 2, utilized to generate feedback signals for control of the servo motors positioning the product handling fixture 25, may be replaced by limit switch scanning means mounted on either the carriage 22 or 25 and having actuator means projecting therefrom to be deflected when the carrier 25 moves by either protrusions from the track 21 or the posts of the racking itself which serve as means for identifying each bay as the carrier passes. Deflection of the switch each time the carrier passes a storage bay may be used to generate a feedback signal applicable for control purposes as is more fully set forth in my above-mentioned application Serial No. 449,874.

Control of the motors M$x$, and M$z$ for positional control of the conveyor and forks is effected by means of a programming system which employs as a basic control means, the relay switch of scanner 38 (FIG. 5) which is adapted to become energized as the work carrying fixture moves either vertically or parallel to the storage racking system and provides a feedback signal to a predetermining controller or counter-relay which is adapted to uncount and become activated at the end of a predetermined movement of said conveyor. When a counter of this system zeros or uncounts and becomes energized as the result the receipt thereof of a predetermined number of pulses from said scanner pulse generator which occurs when the work holding means of the conveyor is at a predetermined position in the system, said counter is adapted to effect the actuation of a switch or switches which effect movement control of said conveyor and holding means by stopping and/or starting a motor or motors. Switch actuating predetermining counters of this type are known in the art and are manufactured by such companies as the Veeder-Root Company of Hartford, Connecticut and Abrams Instrument Corporation of Lansing, Michigan.

Figure 3:
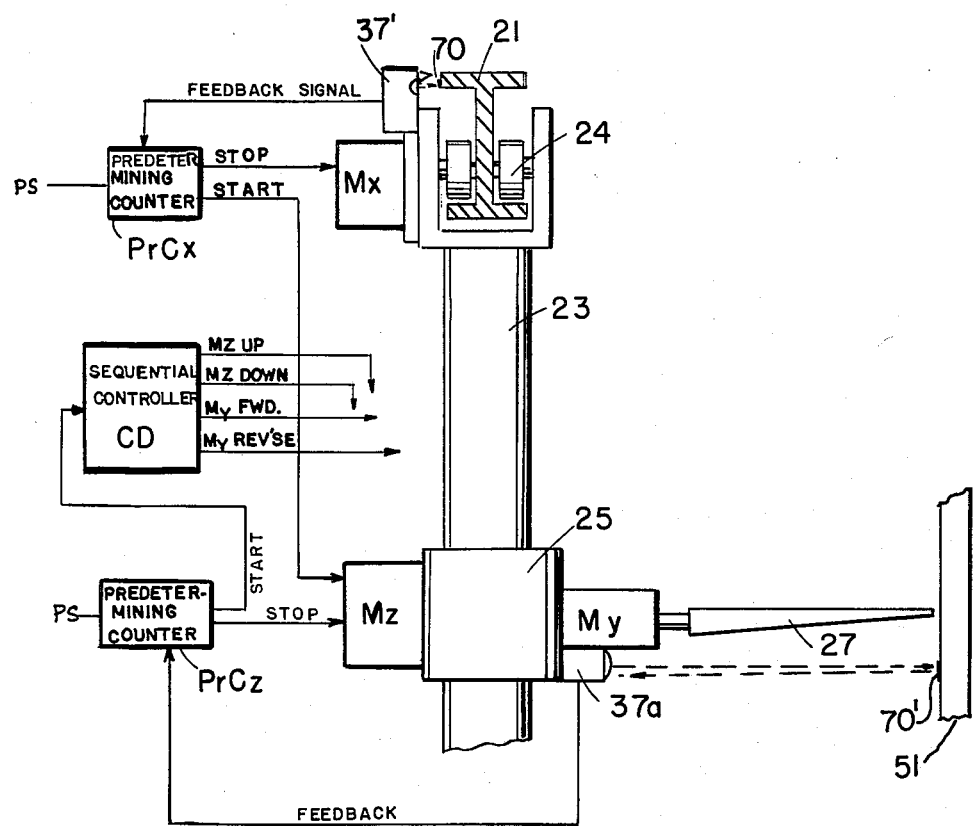
FIG. 3 is a schematic diagram of a portion of the control system for the apparatus shown in FIG. 1.

In the basic control means of the apparatus of this invention, as illustrated in FIG. 3, counters P$r$C$x$, P$r$C$z$ and P$r$C$y$ are provided to control each of the motors M$x$, M$y$ and M$z$; each of which counters is preset to a predetermined value or count prior to the start of movement of the conveying apparatus to control the stopping of said motor after it has driven the work holding means to a predetermined position in the system.

In FIG. 3 is shown, in block diagram notation, the relation between primary feedback and control elements for effecting the movement of the vertical assembly 23 of the type described to a position opposite a predetermined vertical beam 51 of the storage bay or volume 53$a$ of the storage system, from any selected starting position in said system. Two predetermining counters P$r$C$x$ and P$r$C$z$ are provided, each adapted to respectively effect the control of the movement of the first carriage 22 and the second carriage 25 when they uncount or zero by effecting the stoppage of their respective drive motors by respectively energizing the stop controls thereof.

The counter P$r$C$x$ controls motor M$x$ and is adapted to receive feedback pulses generated by the photoelectric scanner mounted on the first carriage 22 which scanner is adapted to scan position indicating markers 70' or the like provided at predetermined positions along the track 21. The scanner 27' is adjusted to provide an output pulse each time it scans a mark or marker on the track 21 resulting from the increase or decrease in light received by said scanner when in line with said marker. The output of scanner 37' is fed to the input of the predetermining counter P$r$C$x$. When P$r$C$x$ zeros, as carrier 20 moves opposite the selected bay a relay therein energizes the stop-control of motor M$x$ and the start control for the motor M$z$. As the second carriage 25 travels up vertical assembly 23', a second photoelectric scanner 37 scans reflective markers on the adjacent vertical beam 51 of the racking and provides, each time it scans a marker, a feedback pulse signal which is transmitted to the second counter P$r$C$z$ which has been preset to control the vertical movement of the second carriage 25 and effect the desired vertical positioning of the holding means. When P$r$C$z$ zeros, a relay means therein energizes the stop-control of motor M$z$, stopping the second carriage 25 at the preselected height or bay. A further relay means in P$r$C$z$ or the output signal therefrom may be used to energize a sequential controller CD, such as a multi-circuit timer, adapted to further control the operation of motors M$y$ and M$z$ in moving the second carriage 25 to further position the article or load located on the fork assembly 36 such as the movement thereof to deposit said load on the selected rack opposite said conveyor. The particular movement of the fork assembly 36 will depend on the characteristics of the sequential controller CD and may include the retraction of the forks to clear the racking system 50.

In FIG. 4, a more general control circuit system diagram is presented which illustrates diagrammatically the scanner 37 which is effective in controlling the various motors of the automatic warehousing system of FIG. 1. The predetermining counting devices PrCy, PrCx and PrCz respectively control the conveying motors My, Mx and Mz in response to feedback signals generated by the conveyer positional scanner 37 which scans reflective markers on racking 53. The predetermining counters may be mounted on the carrier generally, and may be individually adjusted or pre-set locally by manual means or remotely pre-set or adjusted by means of one or more dial switches of the telephone circuit connection type 39 as illustrated in FIG. 4. The counters PrCx, PrCy, PrCz are each provided with interlocked control switching means adapted, when the counter zeros, to effect the combined control of (a) effecting the stopping of one motor and (b) simultaneously starting a second motor to continue the cycle of movement necessary to effect the storage or removal from storage of a palletized load.

In the operation of the control system and apparatus of FIG. 4, the predetermining counters PrCy, PrCx and PrCz are first pre-set by manual or remote means whereby they will uncount and each effect respective control functions upon uncounting by the operation of one or more switches therein. Assuming that the carrier 20 is situated at a starting or zero position and that the predetermining counters PrCx, PrCy and PrCz have been pre-set to effect respectively the desired degree of movement of the overhead first carriage 22 as determined by the operation of motor Mx, the advance travel of the fork assembly as determined by the operation of motor My and the vertical positioning of said fork assembly, as determined by the operation of Mz, then a cycle may be initiated by starting motor Mx. The carrier assembly 20 is then driven by motor Mx down the aisle along track 21 and the feedback signals, generated each time the photocell scanner 37 scans a marker 51 are used to uncount the predetermining counter PrCx. The output 37' (FIG. 4) of the scanner 37 may be connected to all of the counters as illustrated so that they simultaneously uncount with the counters PrCy and PrCz which are pre-set to uncount after receiving the desired number of feedback pulse signals in excess of those received by PrCx for effecting the desired positional control. When PrCx uncounts, a switch therein operates and is effective in stopping motor Mx with the carrier 20 positioned in alignment with the desired vertical row of the storage system. The uncounting or zeroing of counter PrCx is also effective in starting motor Mz to drive the second carriage 25 and to effect the positioning of the carrier fork assembly 36 in vertical alignment with the desired storage bay. The uncounting of the predetermining counter PrCz thereafter is effective in stopping motor Mz with the fork assembly 36 in alignment with the lower part of the selected bay or storage volume 53 and in energizing, when it uncounts, an automatic control device 40 having a controller CD such as a multi-circuit timer, which controls motors Mz and My in a manner to effect movement of the carrier 20 and fork assembly 36 towards the selected bay in the act of depositing the load therein. This is effected by the selective and predetermined operation of said motors, the shafts of which are each controlled to rotate a predetermined number of times and stop in response to the operation of controller CD. The movement of fork assembly 36 in the act of depositing the load or pallet thereon onto the base or horizontal beams 52 of the selected bay of the racking system, includes the advancement of said forks by the operation of motor My which operates until the load is in the bay after which My stops, the lowering of said forks by operation of Mz under the control of CD until the load rests on horizontal beams 52 after which Mz is automatically stopped and braked, and the retraction of said forks by the operation of My in reverse until the ends of the forks clear the face of the racking after which My is stopped by means of the controller CD. At this point CD may automatically effect the starting of motor Mx which causes the carrier 20 to be driven along the track 21 to a starting or predetermined position.

The automatic control device 40 consists of two sequential controllers or multi-circuit timers CD and CD'. CD refers to that section of 40 which automatically controls the motors to position the fork assembly 36 in the act of loading or getting a palletized load from the storage volume which said fork assembly from a position into the storage volume to a position under the pallet whereupon CD stops the forward travel by stopping My; (b) a short upward movement by controlling motor Mz a degree to engage and lift the pallet on the fork assembly so that it just clears the racking; (c) after stopping the upward travel, reversing the operation of motor My for a time necessary to remove the fork assembly and pallet from the vicinity of the storage volume whereby the fork assembly and load may be lowered or raised and/or the carrier 20 moved parallel to the overhead track 21 in a predetermined direction as defined by CD and (d) its operation thereafter of motor Mx and Mz.

The sequential controller CD' refers to the control portion of controller 40 which when preset by the operator and actuated by the operation of predetermining counter as it zeros, effects the sequential operation of the motors My and Mz in a manner to effect the deposit or storage of a pallet already on the fork assembly into the storage volume with which said fork assembly are aligned when controller PrCz uncounts.

A cycle of movements controlled by the sequential controller CD' include: (a) the operation of motor My to drive forks and pallet into the selected storage bay and the stopping of motor My when so positioned, (b) lowering of fork assembly 36 a sufficient degree by controlling motor Mz to permit the pallet to engage and be supported by the base or racking of the selected volume and to become disengaged from the fork assembly, (c) the reverse operation of motor My to retract the fork assembly from the storage volume so that they clear the racking system.

FIG. 5 illustrates in detail the photoelectric scanner 38 and relay used to scan said position indicating reflective markers on the track of the carrier and the racking system. A light source 38a is mounted adjacent the photoelectric cell 37a and is adapted to project a beam of light in the direction of the mount for the reflective position indicating markers 70. The markers 70 may be light absorbing or reflecting material such as small patches of retro-reflective Scotch-Lite sheeting a product manufactured by Minnesota Mining and Manufacturing Company, or may be any material or position indicating, light varying means which will cause the cell 37a to become energized or emit a sensing responsive current as it scans past. An output current from photocell 37a changes the bias of the grid of a vacuum tube 38d, which results in the energization of a relay 38b and provides a pulse on its output 38' which is transmitted as a feedback signal to the respective predetermining counter PrCz, PrCy, or PrCx.

FIG. 6 shows a means for effecting the remote presetting of the predetermining counter controllers PrC of FIGS. 3 and 4. A pulse generating dial switch 39 or the like is situated at the operator's station and is adapted to transmit pulse trains on its output 39W in accordance with the position or number dialed. The output lines 39W extend to respective rails 41 and 41' which are insulatedly supported parallel to the track on which carrier 20 rides and are swept by respective brushes 42 and 43, respectively, expending from the carrier 20. The brushes connect with the respective input terminals of a predetermining counter controller PrC shown mounted directly on the self-propelled conveyor vertical track or assembly 25. By providing the programmable predetermining controller PrC directly on the free travelling conveyor or carrier 20, the control apparatus is substantially simplified. Electrical connection between the multiple unit controllers of PrC, the scanner relay or switch and all servos controlled thereby may be attained by direct, short wiring. The necessity of commutating or transmitting signals and power back and forth between components at a remote control station and the controls on the carrier is thus eliminated. Also, the possibility of losing a feedback control pulse which is generated while the carrier is in motion and may be transmitted while the overhead brush is momentarily disengaged from its stationary conductor, is eliminated. The particular predetermining counter of PrC is preset or programmed to effect a desired control of its motor by pulses generated while the carrier 20 is at rest by rotary dial switch 39. A plurality of dial switches may each be connected to a respective predetermining controller as is 39 by the means illustrated for effecting the described type of positional control of the servo motor operating the conveying apparatus or a single dial switch may be employed with a conventional switching means for gating each pulse train or group of pulse trains to a respective predetermining counter for presetting it to effect the cycle of control described.

The specific apparatus herein illustrated and described is intended to be representative only, as changes may be made therein without departing from the teachings of the invention. Accordingly, reference should be made to the following claims in determining the full scope of the invention.

I claim:

1. Automatic conveying apparatus comprising in combination
   (a) a first guide means,
   (b) a self propelled conveyor including a conveying means in the form of a carriage with means mounted thereon for driving said carriage along said first guide means,
   (c) said carriage having a second guide means mounted thereon and extending in a generally vertical direction;
   (d) a second conveying means mounted for movement vertically along said second guide means,
   (e) a servo drive means mounted on said conveyor for power driving the carriage horizontally along the first guide means and driving said second conveying means vertically relative to said second guide means,
   (f) said second conveying means including a laterally extending fixture for holding an article thereon,
   (g) a storage rack having a plurality of storage bays,
   (h) said first guide means extending substantially parallel to a side of the storage rack which is accessible to the second conveying means,
   (i) means on the storage rack for identifying the relative positions of said bays,
   (j) control apparatus for controlling the operation of said servo drive means for positioning said second conveying means at a predetermined position along said first guide means and at a predetermined vertical position relative to said second guide means,
   (k) a scanning relay means mounted on said self propelled conveyor for scanning said identifying means,
   (l) said identifying means including a plurality of markers in the scanning path of said scanning relay means,
   (m) said scanning relay means generating signals for transmission to said control apparatus each time said scanning relay means scans those markers which are in the scanning path said conveyor is moved,
   (n) said control apparatus including a predetermining counting relay means in circuit with said servo drive means for said carriage said counting means serving to stop said servo drive means upon receipt of a predetermined number of position indicating signals generated by said scanning relay means as said carriage moves along said first guide means.

2. Automatic conveying apparatus comprising in combination
   (a) a first guide means,
   (b) a self propelled conveyor including a conveying means in the form of a carriage with means mounted thereon for driving said carriage along said first guide means,
   (c) said carriage having a second guide means mounted thereon and extending in a generally vertical direction,
   (d) a second conveying means mounted for movement vertically along said second guide means,
   (e) a servo drive means mounted on said conveyor for power driving the carriage horizontally along the first guide means and power driving said second conveying means vertically relative to said second guide means,
   (f) said second conveying means including a laterally extending fixture for holding an article thereon,
   (g) a storage rack having a plurality of storage bays,
   (h) said first guide means extending substantially parallel to a side of the storage rack which is accessible to the second conveying means,
   (i) means for identifying the positions of said bays,
   (j) control apparatus for controlling the operation of said servo drive means for positioning said second conveying means at a predetermined position along said first guide means and at a predetermined vertical position relative to said second guide means,
   (k) a scanning relay means mounted on said self propelled conveyor for scanning said identifying means,
   (l) said identifying means including a plurality of markers in the scanning path of said scanning relay,
   (m) said scanning relay means generating signals for transmission to said control apparatus each time said scanning relay scans those markers in said scanning path of travel as said conveyor is moved,
   (n) said control apparatus including a predetermining counting relay means in circuit with said servo drive means for said carriage, said control apparatus serving to stop said servo drive means upon receipt of a predetermined number of position indicating feedback signals generated as sensed from the identifying means as said carriage moves along said first guide means.

3. Automatic conveying apparatus comprising in combination
   (a) a first guide means,
   (b) a self propelled conveyor including a conveying means in the form of a carriage with means mounted thereon for driving said carriage along said first guide means,
   (c) said carriage having a second guide means mounted thereon and extending in a generally vertical direction,
   (d) a second conveying means mounted for movement vertically along said second guide means,
   (e) a servo drive means mounted on said conveyor for power driving the carriage horizontally along the first guide means and power driving said second conveying means vertically relative to said second guide means,
   (f) said second conveying means including a laterally extending fixture for holding an article thereon,
   (g) a storage rack having a plurality of storage bays, (h) said first guide means extending substantially parallel to a side of the storage rack which is accessible to the second conveying means, (i) means on the storage rack for identifying the positions of said bays, (j) control apparatus for controlling the operation of said servo drive means for positioning said second conveying means at a predetermined position along said first guide means and at a predetermined vertical position relative to said second guide means, (k) a scanning relay mounted on said self propelled conveyor for scanning said identifying means, (l) said identifying means including a plurality of reflective markers in the scanning path of said scanning relay, (m) said scanning relay means generating feedback signals for transmission to said control apparatus each time said scanning relay scans those reflective markers in said scanning path of travel as said conveyor is moved, (n) said control apparatus including a predetermining counting relay means in circuit with said servo drive means for said first and second conveying means, said control apparatus serving to stop said servo drive means upon receipt of a predetermined number of position indicating feedback signals generated as sensed from the identifying means as said first and second conveying means moves along said first and second guide means, respectively.

4. Automatic conveying apparatus comprising in combination: a first guide means, a self propelled conveyor including a first conveying means in the form of a carriage with means mounted thereon for driving said carriage along said first guide means, said carriage having a second guide means mounted thereon and extending in a generally vertical direction, a second conveying means mounted for movement vertically along said second guide means, a servo drive means mounted on said conveyor for driving the carriage horizontally along said first guide means and driving said second conveying means vertically relative to said second guide means, said second conveying means including a laterally extending fixture for holding an article thereon, a storage rack having a plurality of storage bays, said first guide means extending substantially parallel to a side of the storage rack which is accessible to the second conveying means, means for identifying the relative positions of said bays, control apparatus for controlling the operation of said servo drive means for positioning said second conveying means at a predetermined position along said first guide means and at a predetermined vertical position relative to said second guide means, and a scanning relay means mounted on said self propelled conveyor for scanning said identifying means, said identifying means including a plurality of devices for abruptly changing the ambient light pattern in the scanning path of said scanning relay means, said scanning relay means generating signals for transmission to said control apparatus each time said scanning relay means scans said devices which are in its scanning path, said control apparatus including a predetermining counting relay means in circuit with said servo drive means for said carriage, said counting means serving to stop said servo drive means upon receipt of a predetermined number of position indicating signals which are generated by said scanning means as said carriage moves along said first guide means.

5. Automatic conveying apparatus comprising in combination: a first guide means, a self propelled conveyor including a first conveying means in the form of a carriage with means mounted thereon for driving said carriage along said first guide means, said carriage having a second guide means mounted thereon and extending in a generally vertical direction, a second conveying means mounted for movement vertically along said second guide means, a servo drive means mounted on said conveyor for driving the carriage horizontally along said first guide means and driving said second conveying means vertically relative to said second guide means, said second conveying means including a laterally extending fixture for holding an article thereon, a storage rack having a plurality of storage bays, said first guide means extending substantially parallel to a side of the storage rack which is accessible to the second conveying means, means for identifying the relative positions of said bays, control apparatus for controlling the operation of said servo drive means for positioning said second conveying means at a predetermined position along said first guide means and at a predetermined vertical position relative to said second guide means, and a scanning relay means mounted on said self propelled conveyor for scanning said identifying means, means for generating an energy field in the vicinity of said conveyor, said storage bay identifying means are supported in said energy field for abruptly changing the level of said energy field in the immediate vicinity of each of said means, there being at least one such identifying means for each of said storage bays, and scanning relay means responsive to changes in the level of said energy field for generating output signals and arranged to scan said identifying means as said carriage moves, said scanning relay means generating signals for transmission to said control apparatus each time said scanning relay means scans said devices which are in its scanning path, said control apparatus including a predetermining counting relay means in circuit with said servo drive means for said carriage, said counting means serving to stop said servo drive means upon receipt of a predetermined number of position indicating signals which are generated by said scanning means as said carriage moves along said first guide means.

6. Automatic conveying apparatus in accordance with claim 2, wherein said scanning relay means comprise limit switch means, and said markers comprise protrusion means in the path of travel of said limit switch means.

References Cited in the file of this patent

UNITED STATES PATENTS

| 1,554,584 | Lake | Sept. 22, 1925 |
| 2,102,995 | Combs | Dec. 21, 1937 |
| 2,268,800 | Butzien | Jan. 6, 1942 |
| 2,628,539 | Neergaard | Feb. 17, 1953 |
| 2,691,448 | Lontz | Oct. 12, 1954 |
| 2,707,666 | Becker | May 3, 1955 |
| 2,710,934 | Senn | June 14, 1955 |
| 2,748,665 | Senn | June 5, 1956 |
| 2,847,131 | Miller | Aug. 12, 1958 |